United States Patent [19]

Kronstadt

[11] 4,393,907

[45] Jul. 19, 1983

[54] CLUTCH ASSIST APPARATUS

[75] Inventor: Victor Kronstadt, Hagerstown, Md.

[73] Assignee: Mack Trucks, Inc., Allentown, Pa.

[21] Appl. No.: 226,867

[22] Filed: Jan. 21, 1981

[51] Int. Cl.[3] .................... F16D 23/12; G05G 17/00

[52] U.S. Cl. .................................... 192/99 S; 74/2; 74/109; 74/512; 192/89 R; 192/101; 267/174

[58] Field of Search ......................... 74/2, 109, 512; 192/89 R, 99 S, 101; 188/166, 167; 267/174

[56] References Cited

U.S. PATENT DOCUMENTS

| | | | |
|---|---|---|---|
| 1,461,573 | 7/1923 | Browne . | |
| 1,637,734 | 8/1927 | Carhart . | |
| 1,804,903 | 5/1931 | Wemp | 192/99 S |
| 1,860,636 | 5/1932 | Tibbetts . | |
| 1,927,643 | 9/1933 | Hughes | 192/99 |
| 2,043,812 | 6/1936 | Russell | 192/36 |
| 2,458,364 | 1/1949 | Foster | 192/89 |
| 2,985,031 | 5/1961 | Bennett | 74/512 |
| 3,187,867 | 6/1965 | Sink | 192/89 R |
| 3,198,301 | 8/1965 | Randel | 192/17 |
| 3,199,367 | 8/1965 | Zetye | 192/99 S X |
| 3,262,532 | 7/1966 | Phelps | 192/89 |
| 3,319,752 | 5/1967 | Chillson et al. | 192/51 |
| 3,443,673 | 5/1969 | Rosenberger | 192/91 |

*Primary Examiner*—Allan D. Herrmann

*Attorney, Agent, or Firm*—Bernard, Rothwell & Brown

[57] ABSTRACT

A clutch release assist mechanism for avoiding excessive clutch pedal efforts. The assist mechanism includes a spring-loaded apparatus to bias the clutch toward a release disposition, but the assist function is not activated until after initial movement of the release mechanism has been effected by the operator through pedal displacement. The amount of spring bias to assist the mechanism is less than that of the clutch to permit the clutch to revert to a closed or engaged position once the release mechanism has been deactivated. This mechanism includes a rack operated in conjunction with a piston and cylinder arrangement to provide for "free travel" before activation of an assist spring. The rack in turn operates through a sector or pinion to rotate a clutch release shaft between a clutch disengaged and engaged positions.

18 Claims, 6 Drawing Figures

CLUTCH ASSIST APPARATUS

BACKGROUND AND DISCUSSION OF THE INVENTION

The invention relates to an apparatus for disengaging a normally-engaged, spring-loaded clutch to assist a vehicle operator in actuating a lever, linkage or similar mechanism to disengage the clutch against the action of the spring.

Friction clutches are often used for engaging and disengaging a vehicle engine from its transmission, and such clutches are usually of the spring-loaded, normally-engaged type in which a compression spring biases a driven clutch member into engagement with the drive clutch member. These clutch members are capable of transmitting substantial torque loads particularly when used on heavy vehicles such as trucks or tractors. Since the torque on these vehicles is quite high, the springs employed for engaging the clutch must have a high compression strength to obtain sufficient pressure between the drive and the driven members to prevent slippage. It is desirable then that the compression springs be a substantially greater force than any opposing force or forces to create a more effective clutch engagement for transmitting the torque.

However, there are countervailing considerations in connection with the magnitude of the spring force employed for biasing the clutch members together. To disengage a spring-loaded clutch the biasing action of the engaging springs must be overcome, and thus the magnitude of any spring force employed for this purpose should be limited to near the force it takes to disengage the clutch mechanism. For a disengaging operation the operator usually moves a foot pedal or hand lever connected through a linkage to the clutch members to overcome the action of the spring. Upon release of this lever the clutch reverts to its normal engaged position under the action of the springs. When an operator moves the clutch-operating lever to disengage the clutch by overcoming the force of the engaging springs he must hold the clutch lever in this disengaged position during the change in gear shift ratio and until the clutch is to be reengaged. This operation can be performed a multitude of times particularly in driving in city traffic or other similar traffic where many stops and starts are required. As a result an operator expends a considerable time and effort in physically overcoming the high compression of the clutch springs.

To relieve the operator of this burden many devices have been employed to allow the use of engaging springs of greater force and still permit the operator to easily and conveniently overcome the biasing action of such springs. These devices have been called assisting or boosting devices and are characterized by, for example, an over-center spring mechanism which is a tension spring having one end pivotally attached to a pivotally-mounted, actuating lever and having its other end pivotally attached to a fixed support. A specific example of an over-center spring mechanism is shown in U.S. Pat. No. 1,927,643. In this patent the spring is adapted to operate over the center line which lies through the rotational axis of the lever and the pivotal attachment of the springs to the support where the spring urges the lever to rotate in a direction to disengage the clutch when it is on one side of the center line and in opposition to the rotational urging force on the lever caused by the clutch engaging springs. The force produced in this manner on the lever is the product of tension force developed by the spring multiplied by its effective moment arm which is the length of the line perpendicular to the rotational axis of the lever and perpendicular to the direction of the tension force. Thus, the spring becomes increasingly more effective as the lever is moved further and further towards its clutch disengaged position since the effective moment arm becomes greater.

A problem with these devices is that a substantial lever movement is required before the spring reaches the position where it is effective in substantially assisting the operator in releasing the clutch. Another problem with these types of springs lies in controlling the amount of biasing caused by the increased moment during actuation of the lever. It is undesirable that the force rotating the lever should ever reach a value greater than the biasing action of the clutch engaging springs since the clutch will not return to its original position when the lever is deactivated. As a result, care must be taken in effecting the relationship between the spring and the position of the lever to assure that the biasing force never reaches a value greater than that of the clutch engaging springs.

On approach in solving this problem has been a spring and piston assisting device as shown in the U.S. Pat. No. 3,187,867 to Sink which relates to an assist device used to rotate a clutch actuating lever to disengage a normally-engaged, spring-loaded clutch. The assist device includes a cylindrical casing with an actuating rod for reciprocal movement within the casing. An exposed portion of the rod extending from one end of the casing is engaged with a linkage for actuating the clutch, and the cylinder casing is rotatably attached at another end to a stationary support. A spring located at one end of the cylinder within the casing engages a bushing which in turn is pressed against a flange of the casing. The other end of the spring engages a bushing which in the normal position engages balls resting in peripherally-spaced grooves formed in the casing. The rod also includes complementary grooves about its outer surface which in a normal position are laterally displaced from the grooves in the cylinder. However, upon actuation of the clutch mechanism the rod or shaft will be pressed inwardly relative to the cylinder such that the grooves in the rod will eventually register with the grooves in the cylinder casing. At this registered position the spring acting on the bushing transmits force through the balls and shaft thereby imparting an assist force to the operator actuating the system.

This system also suffers from deficiencies in that the balls and grooves for transmitting the force require close tolerances to insure that the spring force is properly transmitted to the shaft for providing the assistance needed to actuate the clutch.

The assist mechanism of the present invention overcomes many of the problems of complexity, expense and unreliability which have characterized assist mechanisms of the past. In one embodiment of the invention the mechanism includes a housing which is fixed relative to a rotatable clutch release shaft which is in turn keyed to a yoke for driving a clutch member away from an engaged position. Within the housing there is a sector splined to the clutch release shaft to produce rotation of the shaft and ultimately rotation of the yoke. Engaged with this sector is a rack which provides input for operator pedal effort and is spring-loaded to produce the assist force to the input. A portion of the rack extends beyond the housing for engagement with the linkage to a pedal within the cab or other actuating mechanism to move the clutch assist mechanism. A "free-travel" mechanism within the housing provides for a degree of unassisted relative movement by the rack with respect to the housing when the rack is actuated through the clutch-actuating linkage. Upon traversing the "free-travel" extent of rack movement, the rack will overcome the "free-travel" mechanism and permit the spring within the housing to assist in driving the rack relative to the housing toward a clutch-disengaged position. This rack movement is transmitted into rotational movement through the sector to complete the disengagement of the clutch.

In one embodiment of the invention the "free-travel" is achieved through a piston-cylinder arrangement where the assist spring is engaged with the piston for providing the assisting force during movement toward a clutch disengaged position. The piston, however, is constrained from movement by interaction of balls with grooves in the cylinder walls until the piston is released by action of a rack after "free-travel" movement is completed. During the "free-travel" portion of the rack traverse, the rack movement is relative to the stationary piston. During movement toward the clutch disengaged position after an initial "free" travel, grooves in the rack register with the balls. In this position the balls engage rack recesses to provide a means for permitting the assist spring to operate on the rack.

In another embodiment of the invention the "free-travel" is achieved through a piston-cylinder arrangement integrated with a detent mechanism to provide for a "free-travel" movement before the assist spring is actuated. The piston is constrained from movement by the interaction of a spring-loaded poppet ball until release by action of the rack after "free-travel" portion of rack movement has been traversed. On a portion of the rack entending through the piston, blocking members are spaced apart on either side of the piston a distance equivalent to the length of "free-travel". During movement toward a clutch disengaged position one of the blocking members can engage the piston after an initial "free-travel" and release the detent mechanism for permitting the assist spring to operate on the rack in a manner similar to that of the first embodiment discussed above.

The provision of unassisted initial or "free-travel", allows the operator to "feel" the necessary "free-travel" between the clutch release yoke and the release bearing. This is required to determine if the clutch needs adjusting, since as the driven members wear, the release bearing moves toward the fly wheel. Thus, loss of free travel is indicative of clutch wear and serves to readily determine means for assuring that clutch is properly adjusted. In cases of clutches with internal self-adjusting mechanisms, maintenance of free travel assures that the self-adjustor is working properly.

The invention provides the ability to tailor the device, maximize control and avoid unreasonably high pedal efforts or excessive, larger pedal travel which produces operator fatigue and discomfort. The timing of the application and the amount of the bias is a function of, among other factors, the positioning of the rack "free-travel" mechanism and housing stop mechanisms, the size of the rack and sector, and the amount of force and rate of the assist spring. Another advantage which results from the invention is the diminishing of the assist force of the spring during rack movement as disengagement is continued. Some popular types of heavy duty, pull-type clutches exhibit release bearing load curves which rise to a maximum value during initial release, and thereafter diminish until full release is achieved. In the present invention as the assist spring extends with rack translation, the amount of assist force diminshes which may produce a nearly constant, comfortable pedal effort from engaged to release or disengaged positions. On clutches having increasing bearing loads with increasing release travel, increasing pedal efforts could be reduced. Staging of stiff springs would also be possible to overcome the increased pedal effort required.

In the case of full power hydraulic and pneumatic arrangements such "feel" as discussed above in connection with the invention is difficult to obtain and often requires the addition of detenting devices within the control valving system. However, this is to be distinguished from a full hydraulic arrangement where the operator's input energy to the pedal creates the energy to displace the fluid and release the clutch as opposed to an engine driven pump. In the former system there is little loss of "feel". Rather, the amount of input effort is proportional to the amount of resistance at the output.

Other advantages are afforded by the self containment of the mechanism of the present invention. Not only is clutch disengagement facilitated by eliminating the need for substantial anchorage and securing means associated with the over-the-center-spring designs, but the unit of the present invention also safely contains the spring mechanism to avoid injury. The unit is sealed and lubricated, protecting the more critical components against a rather harsh track and road environment. In the event the assist spring should fail the mechanism would fail safe since the clutch could still be released, although with substantially more effort, and secondary damage would be minimal. The use of a rack and sector to gain additional mechanical advantage and the use of a coiled spring configuration compacts the design of the invention, and allows the use of a high reliability spring with excellent fatigue strength. The combination of external pressure and high stress has often been a problem with leaf spring-assist mechanisms.

Other advantages of the invention will become more apparent from a discussion of the preferred embodiments which follows.

DETAILED DESCRIPTION OF THE PREFERRED EMBODIMENT

Figures 1, 3:
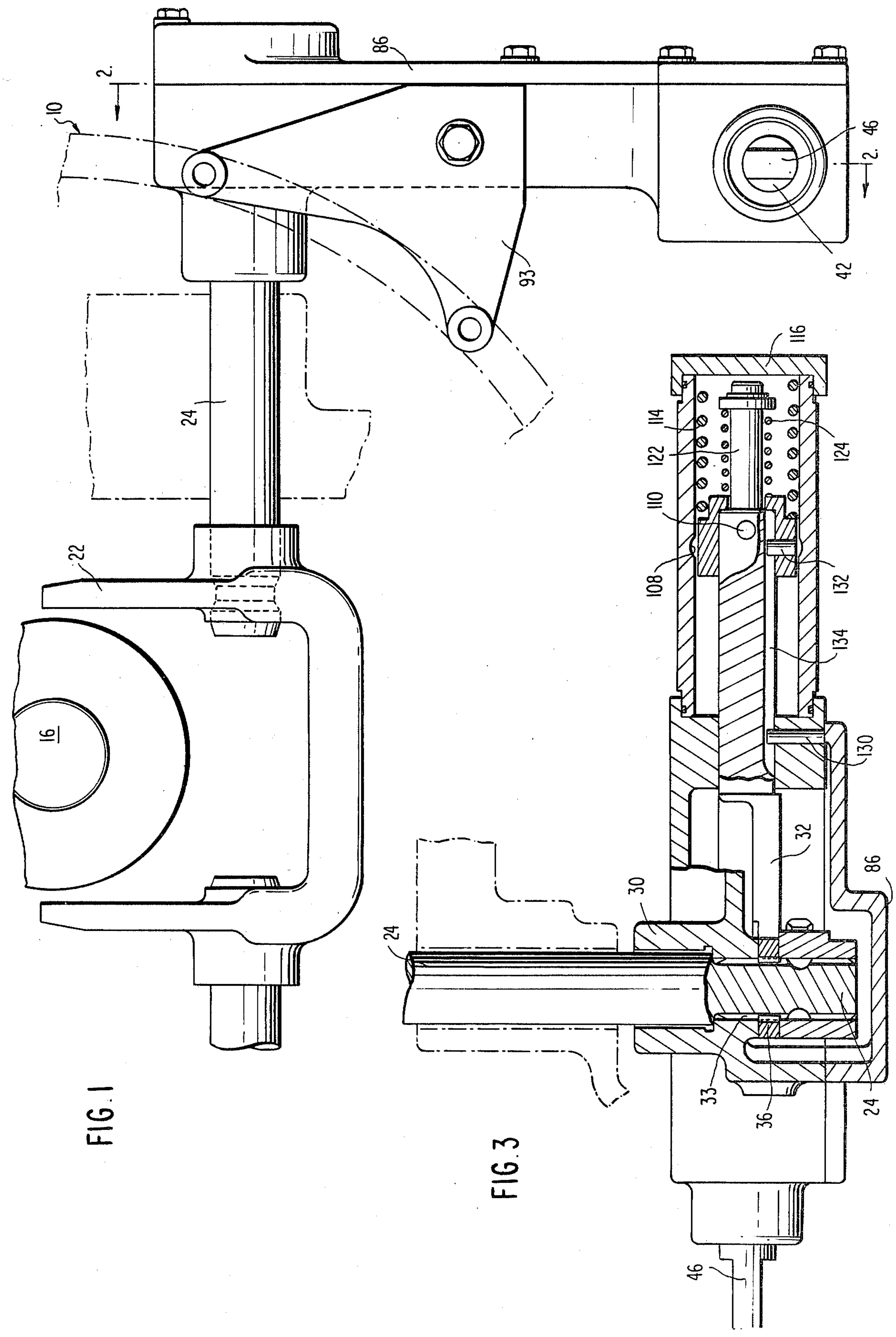
FIG. 1 is a front view of a clutch release mechanism of the invention.
FIG. 3 is a cross-sectional view of the release mechanism shown in FIG. 2 taken along line 3—3.
Figures 2, 2A:
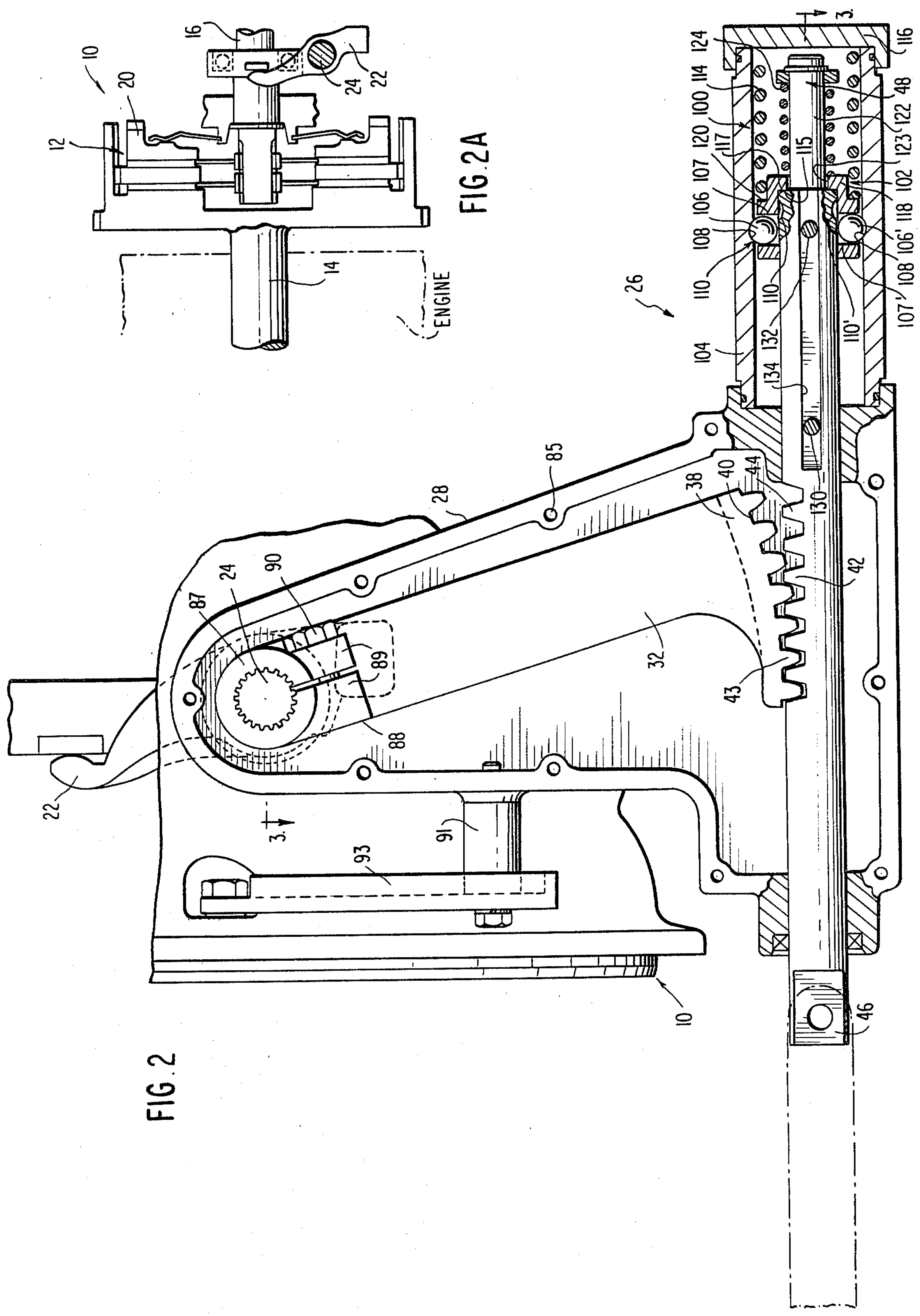
FIG. 2 is a cross-sectional view of the release mechanism shown in FIG. 1 taken along line 2—2.
FIG. 2A is a clutch activated by the release mechanism of FIG. 2.

As can be seen in FIG. 2A, a clutch mechanism 10 is spring-loaded to maintain engagement between clutch plates 12 to transfer torque between the engine and the shaft 16 of the drive train not shown in this figure. The clutch serves to engage and disengage drive member 14 which is connected to the engine and a driven member or shaft 16 which is connected to the drive train for transferring the torque from the engine ultimately to the wheels. For actuating the clutch plates from an engaged to a disengaged position a linkage connects a pedal within the vehicle cab (not shown) to pressure plate 20 of driven member 16. A clutch fork 22 is engaged with a thrust bearing 21 for moving pressure plate 20 to the desired disengaged position, and is mounted for angular movement with clutch release shaft 24 which forms part of the clutch assist assembly 26 shown generally in FIG. 1.

The assist assembly 26 is integrated with the lever 18 to aid the operator in disengaging the pressure plate 20 from the drive member 14 typically to change gear ratios in the transmission. More specifically, the clutch-assist assembly includes a housing 28 in which are found several elements to assist the operator in disengaging the clutch. The housing 28 is journalled onto clutch release shaft 24 by a journal 30 which circumscribes the shaft 24 and allows the shaft to move rotationally independently of the housing. The clutch release shaft 24 has a spine portion 33 about which journal 30 is rotatably fixed. A sector 32 which is a plate member having a circular cutout portion 34 with splines 36 is fixedly secured with splines 33 of shaft 24 for rotation with shaft 24. A portion 38 of sector 32, remote from the circular cutout portion 34, includes an arcuate portion 40 with teeth 43 for engaging rack 42 which moves along a linear path in the lower part of housing 28. The series of spline gear teeth 43 are equally spaced on arcuate portion 40 for engaging complementary gear teeth 44 upstanding in the rack 42. In this way the linear motion of rack 42 is transferred to rotational motion of the clutch release shaft 24 through the sector 32. The arcuate portion 40 of sector 32 in conjunction with the movement of rack 42 is sufficient to provide for rotational movement through at least a 16° arc. This movement of sector 32 is completely within the housing and is sufficient to disengage the clutch.

It is by the movement of rack 42 that the assist mechanism eventually provides additional bias to enable the operator to disengage clutch plates 12 more readily. For this purpose, rack 42 has an exposed portion 46 at one end, and another end 48 of the rack is engaged by the force of a spring within housing 28. A "free-travel" mechanism 100 is integrated with the end 48 of the rack to provide for rack movement over a portion of the path without the assist force of the spring being imparted to the rack. Upon subsequent movement, however, the "free-travel" mechanism is actuated thereby permitting the force of the spring to be imparted to the rack and to assist movement of the rack toward a position of clutch disengagement.

"Free-travel" mechanism 100 includes a piston 102 arranged within cylinder 104 for relative movement therein along a generally linear path corresponding to the path of rack movement. Spherical bearings or balls 106 and 106' are carried within ball cylinders 107 and 107' of piston 102 and can be moved in the annular space between the rack 42 and cylinder 104 under certain conditions. These bearings cooperate with other elements of the mechanism to provide the "free-travel" described above and transmit assist-spring force to the rack after the "free-travel" path has been traversed. For this dual function there is provided a cylinder groove 108 which completely circumscribes the internal surface of cylinder 104 and extends radially, transversely to the path of movement of rack 42. The groove 108 is sufficiently deep that it can accommodate the bearings 106 and 106' in the opposed relationship as shown in FIG. 2 such that the force imparted upon the piston 102 by the spring 114 will be directed, through the bearings when in groove 108, to the cylinder wall. Rack 42 defines opposed recesses 110 and 110' for receiving bearings 106 and 106' when the recesses are registered with groove 108. As with the groove 108, recesses 110 and 110' are configured to accommodate the bearings such that the force imparted upon piston 102 by spring 114 will be directed, through the bearings when located in the recesses, to the rack and at least in part in the direction of clutch disengagement. The bearing movement with the piston is a function at least in part of the bearing size, annular space dimension around rack 42 inside of cylinder 104, and the groove and recess configuration. Each bearing has a diameter greater than the radial dimension of the annular space between the rack and the inner wall of the cylinder such that in normal circumstances the bearings simply cannot fit in the annular space. The recesses and groove however are configured to receive a sufficient portion of each bearing such that the remaining portion of a bearing is less than the radial dimension of the annular space to permit rack movement within cylinder 104 when bearings 106 and 106' are in recesses 110 and 110' or groove 108. With this configuration the piston is controlled by the location of the bearings with respect to the groove and recess.

When the bearings are located in groove 108 initial travel of the rack relative to the bearings 106 and 106' is permitted. However, when the rack recesses register with these bearings in groove 108 the bearings will move into recesses 110 and 110' by riding out of groove 108 due to the action of the piston, and thereby allow the force imparted to the bearings by spring 114 to be transferred to the rack 42 rather than the cylinder walls. During further movement in this condition the bearings will move with the rack 42 toward the clutch disengaged position, along with the piston 102.

The assist spring 114 under the normal condition prior to actuation by the operator is maintained in a compressed disposition between cap 116 at an end of cylinder 104 remote from the housing 28. A portion of the piston 102 is configured to maintain the spring in a proper seated disposition against a face of the piston to insure that the force of the assist spring 114 is not otherwise impaired by improper arrangement of the spring. Piston 102 includes a protruding center portion 118 which is circumscribed by spring 114 and an annular flange portion extending radially toward the cylinder wall to define a spring seat 120 against which the assist spring 114 seats or presses. The end of rack 42 includes an extended rod portion 122 of a diameter smaller than the remainder of the rack for extension through a hole 123 in the center of the piston and toward end cap 116 as can be seen in FIG. 2. The innermost portion 115 of piston 102 engages shoulder 117 formed by rack portion 122 being of smaller diameter.

A helical secondary spring 124 circumscribes the extended rod portion 122 and is maintained in a compressed state between the face of the protruding center portion 118, piston 102 and a spring retainer 128 on the end of the rack. With secondary spring 124 in the compressed disposition the rack is biased toward a clutch engaged position, i.e., toward the right when the mechanism is viewed as it is shown in FIG. 2. The secondary spring 124 provides a lesser force than primary assist spring 114 when under compression, and is readily overcome by operator pedal effort which moves rack 42 out of housing with lever 18 when the latter is moved to the left by the operator for clutch disengagement. Because of the action of secondary spring 124, rack 42 will revert to its starting position adjacent piston 102 upon clutch pedal release and clutch engagement.

To insure the proper positioning of the recess 110 relative to the ball bearings 106 and 106' it is desirable to maintain the rack in a fixed orientation relative to the longitudinal axis of the piston and cylinder. This is accomplished through a mechanism for allowing the longitudinal movement of the rack relative to the cylinder while preventing relative rotational movement. For this purpose the rack is provided with the longitudinal slot 134 into which extends a fixed rack pin 130 mounted on the wall of housing 28. The effective diameter of pin 130 is slightly smaller than the width of the slot, and the pin is displaced from the bottom of the slot such that there can be relative longitudinal movement between the rack and cylinder while relative rotational movement is prevented. Similarly, to maintain proper piston orientation, the piston 102 also carries a piston pin 132 which extends into slot 134. As a result of this configuration ball bearings 106 and 106' as carried by the piston will always be in the correct orientation relative to the recesses on the shaft.

In operation, when it is desired to change gear ratios, the clutch pedal or other similar linkage mechanisms will be depressed or otherwise operated by the operator in the cab. (The pedal and its associated mechanism is not shown in the drawings.) This depression through the linkage mechanism connected to the exposed portion 46 of rack 42 will effect rack movement to the left as shown in FIG. 2 to initiate movement of the clutch mechanism. In this initial movement ball bearings 106 and 106' are in engagement with cylinder 104, and consequently the force imposed by the spring 114 on piston 102 is transferred through the ball bearings to the cylinder wall. Even though force is imposed on the rack by operator actuation the piston will not be moved, but rather the rack will be moved relative to balls 106 and 106' when sufficient force is applied to overcome the action of secondary spring 124. This "free-travel", i.e., unassisted rack movement, occurs until the recesses 110 and 110' register with the ball bearings 106, 106' in groove 108. Once this position is reached the ball bearings 106 and 106' will move radially inwardly out of groove 108 and into the recesses 110 and 110'. As a result of this radial movement by the ball bearings the force transmitted by assist spring 114 will then be directed to the rack rather than the wall of the stationary cylinder. Consequently, further depression of the clutch pedal by the operator will be assisted by the action of assist spring 114 on the rack. More specifically the assist spring by acting on the piston 102 presses against the bearings in recesses 110 and 110' which transfers the force of the spring to the rack and provide an assist force to the operator in moving the clutch to a disengaged position.

Upon return to the normal position when the clutch is engaged, the entire rack and piston assembly will move as a unit toward the right as shown in FIG. 2 under the action of clutch springs. Once ball bearings 106 and 106' register with cylinder groove 108 the bearings will move radially outwardly into groove 108 upon continued movement of rack 42 to the right of rack as shown in FIG. 2. The ball bearings cannot continue movement to the right with the rack since they move into groove 108 of cylinder 104 due to the force of rack movement. However, there will be a slight continual movement of the rack toward the right, due at least in part to the action of secondary spring 124; but this will be relative to piston 102 since the piston will be fixed by the positioning of the ball bearings within the groove 108. Movement of the rack will continue until its shoulder 117 abuts the internal surfaces of protrusion 115 of piston 102 which prevents further movement. In this position the mechanism 100 is ready for the next disengagement of the clutch mechanism.

The housing 28 includes a cover plate 86 which is releasably secured to the front portion of housing 28 at threaded bores 85. This allows ready access to those portions of the mechanism which may require lubrication, repair or replacement while protecting these portions of the assist mechanism from debris and other damage during their normal operation. For holding the mechanism in place, particularly those elements which are fixed to the shaft, in place there is provided a clamp assembly 88. This assembly is a U-shaped, internally splined clamp 87 to engage splines of release shaft 24 and includes two legs 89 for receiving clamp bolt 90. When the elements, the sector, rack, housing and shaft, are in the proper disposition, clamp assembly 88 is then placed on the shaft last as can be seen in FIG. 2 with the bolt 90 threaded down to secure clamp 87 in place and hold both housing 28 and the sector 32 in the proper disposition. Housing 28 is secured in place by projection 91 and arm 93.

Figure 4:
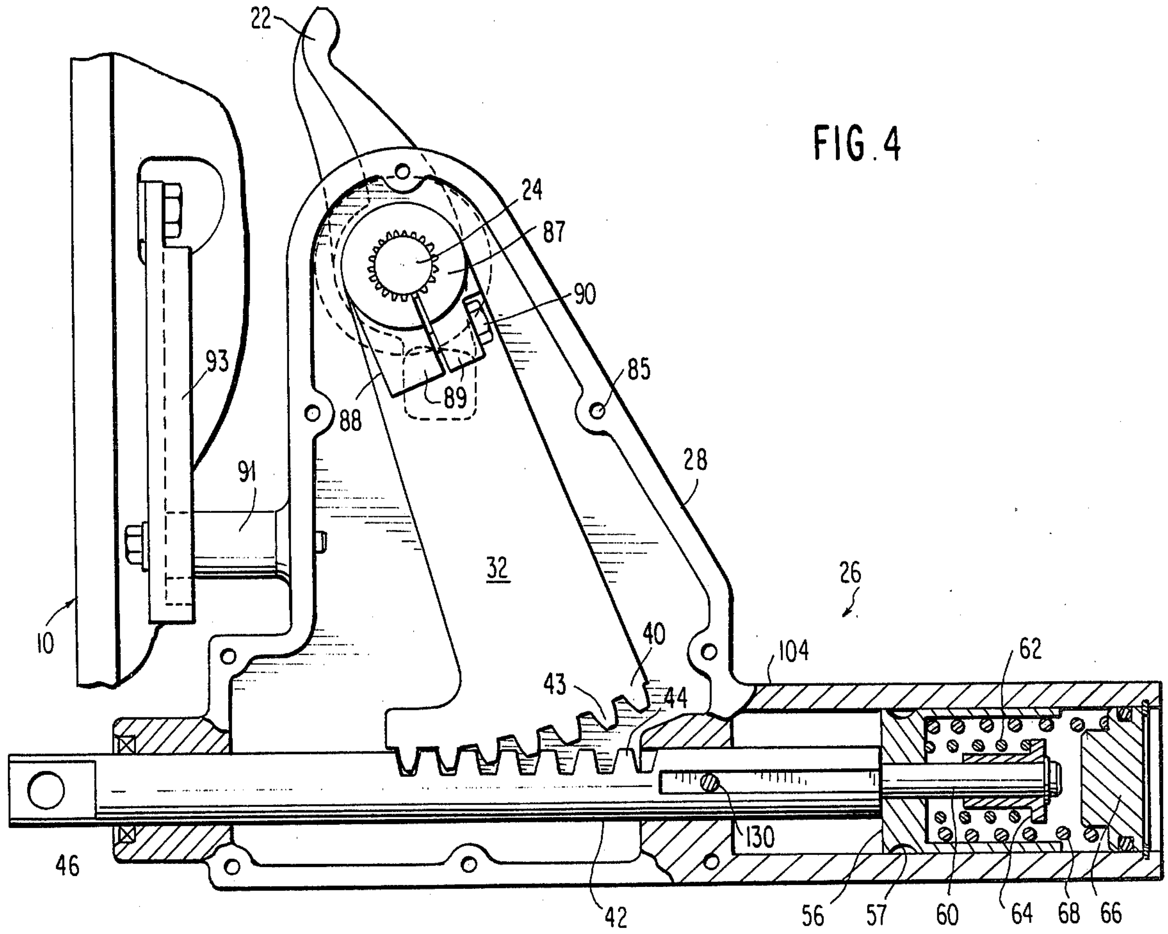
FIG. 4 is a cross-sectional view of another embodiment of the invention.
Figure 5:
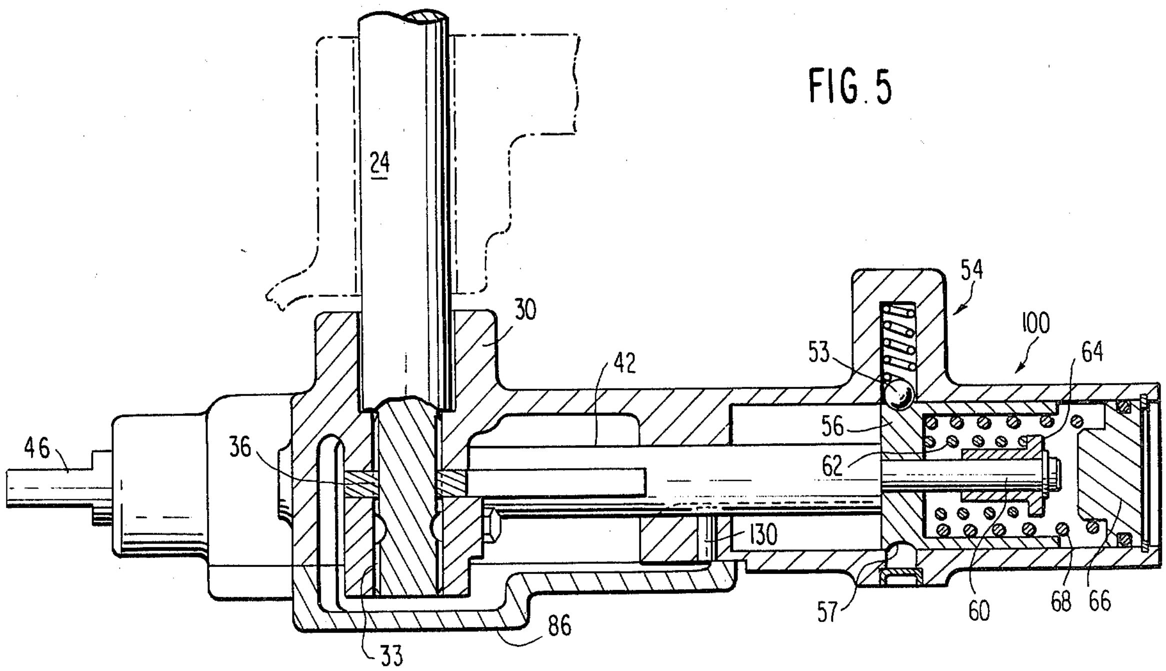
FIG. 5 is a cross-sectional view of the embodiment of FIG. 4 taken along line 5—5.

Another embodiment of the clutch release mechanism of the invention is shown in FIGS. 4 and 5 where like reference numerals are used in referring to parts similar to those in the embodiment of FIGS. 2 and 3. The major distinction between the embodiments relates to the movement of the assist mechanism prior to actuation of the assist spring 114.

The assist spring mechanism 100 includes a poppet assembly 54 similar to the assembly described in conjunction with the embodiment of FIG. 2 except for the configuration and location of the groove for receiving the poppet ball. A piston 56 is provided adjacent the end of rack 42 for movement within the cylinder portion 55 in cooperation with other elements of the clutch release assist mechanism. The piston has an outer surface in which the groove 57 is carved for receiving spring-loaded, poppet ball 53 of poppet assembly 54. The rack 42 has a smaller distal end shaft 60 which extends through a hole in the center of the piston to provide for relative movement between the piston and the rack. At the end of shaft 60 there is a spring retainer 64 for holding secondary spring 62 between the retainer 64 and an internal surface of the piston 56. The secondary spring 62 maintains a bias on rack 42 in a direction away from clutch disengagement and in this case toward the right end of the housing as shown in FIG. 4. At the end of the cylinder 55 there is an end cap 66 for engaging and retaining primary assist spring 68 which is the major force providing the assist of the clutch release mechanism as does the spring 114 in connection with the embodiment of FIG. 2.

In operation, the clutch pedal or linkage as discussed above is activated to depress poppet roll 53 into its housing and initiate the spring assist mechanism. However, the initial movement will be a translation of the rack 42 leftward as shown in FIG. 4 toward a position of clutch disengagement and through a path of "free-travel". The "free-travel" is defined by the distance between the end of spring retainer 64 and the opposed internal surface of the piston 56. This "free-travel" overcomes the bias of the secondary spring 62. Once the "free-travel" has been traversed, upon continued depression of the clutch pedal or other actuating mechanism the force will be sufficient to force poppet ball 53 upwardly into its housing thereby releasing the force of the assist spring against the end of the rack and moving the entire piston assembly to the left or toward clutch disengagement. Thus once the poppet assembly has been disengaged in this manner the assist spring then will apply assist force in the same direction for clutch disengagement. Upon release of the clutch pedal the rack and cylinder will be moved to the right as shown in FIG. 4 due to the force of the clutch springs and secondary spring will serve to insure that the rack is returned sufficiently to seat the poppet ball 53 in groove 57 for the next actuation of the clutch.

It can be seen from the above description that the clutch assist mechanisms of the invention overcomes many problems which have characterized by the prior art. It should be understood, however, that the above is merely a discussion of the preferred embodiments of the invention.

I claim:

1. A clutch assist mechanism for assisting clutch disengagement comprising:

(a) a clutch release shaft for rotation between clutch-engaged and disengaged positions;

(b) a movable member for movement along a substantially linear path for rotation of said clutch release shaft;

(c) a radial member fixed to said shaft and extending radially therefrom, said radial member having a portion for engaging said movable member to translate linear movement of said movable member into rotational movement of said shaft;

(d) biasing means for biasing said movable member in a direction of the linear path corresponding to a clutch-disengaged position; and (e) means for preventing said biasing means from assisting movement of said movable member along the linear path until after an initial movement along at least a portion of said linear path;

(f) said movable member being a rack having upstanding gear teeth, and said radial member being a sector in which said portion for engaging said movable member is arcuate and includes complementary gear teeth for engagement with the gear teeth of said rack.

2. The apparatus according to claim 1 wherein said rack and said sector are included in a housing for movement at least in part within said housing.

3. The apparatus according to claim 2 wherein said housing includes a removable cover for protecting said rack and sector and for providing access to said rack and sector for maintenance.

4. The apparatus according to claim 1, wherein the means for preventing said biasing means from assisting movement of said movable member includes a cylinder and a piston retained within the cylinder for relative movement therein, means for releasably engaging said piston with said cylinder to prevent application of said biasing means through said piston to said movable member until after initial travel of said movable member relative to said piston.

5. The apparatus according to claim 4 wherein said movable member includes a rod portion, said rod portion and said cylinder define an annular space therebetween, said means for releasably engaging said piston with said cylinder includes at least one ball located between said rod portion and said cylinder, said cylinder having a groove for receiving a portion of said ball, said rod portion having a recess for receiving a portion of said ball and located on said rod portion for registration with said groove after said initial travel to permit movement of said ball member transverse to the path of said rod portion into said recess for movement in said cylinder with said rod; said cylinder, said piston, and said rod portion cooperating during movement of said rod portion to prevent piston movement while said ball is in said groove and to permit piston movement when said ball is in said recess of said rod portion.

6. The apparatus according to claim 5 wherein said biasing means includes a first resilient means under compression for urging said piston toward a clutch-disengaged position.

7. A clutch assist mechanism for assisting clutch disengagement comprising:

(a) a clutch release shaft for rotation between clutch-engaged and disengaged positions;

(b) a movable member for movement along a path for rotation of said clutch release shaft;

(c) biasing means for biasing said movable member in a direction of the path corresponding to a clutch disengaged position, said movable member including a rod portion extending through said piston for movement therein, said biasing means including a first resilient means under compression for urging said piston toward a clutch disengaged position, a second resilient means under compression between said rod portion and said piston and urging said rod portion into abutting relationship with said piston, the compressive force of said second resilient means being less than such force of said first resilient means when said clutch release shaft is in a clutch-engaged position.

8. The apparatus according to claim 7 wherein a hole extends through the piston, said rod portion includes a portion extending through said hole to provide for relative movement of said rod portion with respect to said piston.

9. The apparatus according to claim 8 wherein said extended portion of said rod portion includes a retainer means and said second resilient means is a secondary spring retained in compression between the retainer means and the piston to bias said rod portion in the abutting relationship.

10. The apparatus according to claim 9 wherein said rod portion and said cylinder define an annular space therebetween, said means for releasably engaging said piston with said cylinder includes at least one ball member located between said rod portion and said cylinder, said cylinder having a groove for receiving a portion of said ball member, said rod portion having a recess for receiving a portion of said ball member and located on said rod portion for registration with said groove after said initial travel to permit movement of said ball member transverse to the path of said rod portion into said recess for movement in said cylinder with said rod; said cylinder, said piston, and said rod portion cooperating during movement of said rod portion to prevent piston movement while said ball member is in said groove and to permit piston movement when said ball member is in the recess of the rod portion.

11. The apparatus according to claim 6 or 10 wherein the ball member has an effective diameter greater than radial dimension of the annular space between the cylinder and said rod portion.

12. The apparatus according to claim 11 wherein said piston includes a radial slot for receiving said ball member such that said ball member can move radially with respect to said piston.

13. The apparatus according to claim 12 wherein said first resilient means is an assist spring, said cylinder groove is configured to receive a sufficient portion of said ball to avoid interference with the rod portion movement but prevent said piston from being moved into actuating engagement with the rod portion under the action of said assist spring, said depression being configured to receive a sufficient portion of the ball when registered with said groove so the remaining portion of the ball member will not interfere with the rod portion movement, but the ball will move out of the groove into said depression to allow the piston to move into engagement with said rod portion under the action of said first assist spring and to assist further movement of said movable member toward a clutch-disengaged position.

14. The apparatus according to claim 13 wherein said rod portion includes a longitudinal slot, said cylinder having a pin fired thereto and extend into said slot for maintaining angular orientation of said rod portion relative to said cylinder while permitting movement of said rod portion along the linear path.

15. The apparatus according to claim 14 wherein said piston includes a piston pin fixed to said piston and extending into said slot for maintaining angular orientation of said piston relative to said rod portion to maintain said ball registered with said depression.

16. A clutch assist apparatus for assisting clutch disengagement comprising:

(a) a shaft for actuating a clutch between an engaged and a disengaged position;

(b) a movable member displaced from said shaft, and support means for supporting said member for movement with said shaft, where at least part of the movement of said movable member is in a substantially linear path;

(c) a radial member fixed to said shaft and extending radially therefrom, said radial member having a portion for engaging said movable member to translate movement of said movable member to rotative movement of said shaft between the clutch engaged and disengaged positions;

(d) biasing means for biasing said movable member in a direction of said linear path corresponding to a clutch disengaged position;

(e) said movable member having one portion for actuation and another portion for engagement by said biasing means;

(f) detent means for preventing said biasing means from assisting movement of said movable member along the linear path until after an initial movement by said movable member; and (g) means for permitting said initial movement including a piston retained for movement within a cylinder and engaged by said detent means, said movable member extending through the head of said piston for relative movement therewith, first and second blocking means on said movable member on alternate sides of said piston head to prevent further travel of said movable member relative to said piston beyond the length of said initial movement.

17. The apparatus according to claim 16 wherein said detent means includes a poppet ball, said piston defining means for receiving a portion of said poppet ball, detent biasing means for biasing said poppet ball into said means in said piston for receiving a portion of said poppet ball with a sufficient force to restrain movement of said piston relative to said cylinder upon actuation of said movable member by an operator until after the initial movement of said movable member.

18. The apparatus according to claim 17 wherein said detent biasing means includes a helical spring under compression for biasing said ball radially against said piston.

* * * * *